US009282115B1

(12) United States Patent
Kaushik et al.

(10) Patent No.: US 9,282,115 B1
(45) Date of Patent: Mar. 8, 2016

(54) SYSTEMS AND METHODS FOR DETECTING CACHE-POISONING ATTACKS IN NETWORKS USING SERVICE DISCOVERY PROTOCOLS

(71) Applicant: Juniper Networks, Inc., Sunnyvale, CA (US)

(72) Inventors: Anil Kaushik, Bangalore (IN); Vineet Verma, San Jose, CA (US); Stephen Grau, Pleasanton, CA (US); Sreenivas Voruganti, Bangalore (IN); Abhishek Kumar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 197 days.

(21) Appl. No.: 14/146,884

(22) Filed: Jan. 3, 2014

(51) Int. Cl.
*G06F 11/07* (2006.01)
*G06F 12/02* (2006.01)
*G06F 21/00* (2013.01)
*H04L 29/06* (2006.01)

(52) U.S. Cl.
CPC .................................. *H04L 63/1441* (2013.01)

(58) Field of Classification Search
CPC ..... H04L 2463/00; H04L 61/00; H04L 61/10; H04L 61/15; H04L 63/00; H04L 63/14; H04L 67/00; G06F 11/07; G06F 12/02; G06F 12/08; G06F 21/00; G06F 21/50; G06F 21/55; G06F 21/56
USPC ....................... 726/1–3, 11–14, 26, 27, 29, 30
See application file for complete search history.

(56) References Cited

U.S. PATENT DOCUMENTS

| | | | | |
|---|---|---|---|---|
| 6,771,649 B1 * | 8/2004 | Tripunitara | ............. | H04L 45/00 370/395.54 |
| 8,302,190 B2 * | 10/2012 | Li | ........................ | H04L 63/1466 370/395.54 |
| 2006/0088037 A1 * | 4/2006 | Finley | ............... | H04L 29/12009 370/395.54 |
| 2006/0209818 A1 * | 9/2006 | Purser | ............... | H04L 29/12009 370/389 |
| 2007/0208935 A1 * | 9/2007 | Choi | ..................... | H04L 63/123 713/161 |
| 2013/0111589 A1 * | 5/2013 | Cho | ........................ | H04L 61/103 726/23 |
| 2014/0201457 A1 * | 7/2014 | Sinai | ..................... | G06F 12/121 711/135 |

* cited by examiner

*Primary Examiner* — Joseph P Hirl
*Assistant Examiner* — Kalish Bell
(74) *Attorney, Agent, or Firm* — ALG Intellectual Property, LLC

(57) ABSTRACT

A computer-implemented method for detecting cache-poisoning attacks in networks using SDPs may include maintaining a cache of service information that identifies services provided by client devices connected to a network using an SDP. The method may also include detecting a cache-poisoning attack by (1) receiving, from a client device connected to the network, an SDP message related to a service allegedly provided via the network, (2) identifying, within the SDP message, an attribute of the service allegedly provided via the network, and then (3) determining that the client device is attempting to corrupt the cache of service information by determining that the identified attribute of the service suggests that the service is illegitimate. Finally, the method may include performing a security action to mitigate the cache-poisoning attack in response to detecting the cache-poisoning attack. Various other methods, systems, and computer-readable media are also disclosed.

20 Claims, 6 Drawing Sheets

SYSTEMS AND METHODS FOR DETECTING CACHE-POISONING ATTACKS IN NETWORKS USING SERVICE DISCOVERY PROTOCOLS

BACKGROUND

Service discovery protocols (SDPs) may facilitate the automatic detection of services offered by devices connected to a computer network. For example, client devices may distribute SDP messages that announce services offered by these client devices via an access point of a Wireless Local Area Network (WLAN). During the distribution of the SDP messages, the access point may extract information about the services from these messages and then store the information in a cache. Other client devices connected to the computer network may then discover these services by querying the access point for the information stored in the cache.

Unfortunately, while SDPs may facilitate automatic detection of services offered by the client devices connected to the computer network, SDPs may also enable attackers to "poison" the cache that stores the information about these services. For example, an attacker may distribute one or more illegitimate SDP messages that announce fake and/or non-existent services. Additionally or alternatively, an attacker may distribute one or more illegitimate SDP messages that update the cache with false information about existing services.

Moreover, traditional access points may fail to authenticate the legitimacy of these SDP messages prior to extracting the service information from the SDP messages and/or storing the service information in the cache. As a result, these traditional access points may provide illegitimate service information to the client devices in response to their queries for the information stored in the cache. The client devices may then request, but fail to reach, one or more of the services identified in the illegitimate service information, potentially leading to wasted time and/or resources.

The instant disclosure, therefore, identifies and addresses a need for systems and methods for detecting cache-poisoning attacks in networks using SDPs.

SUMMARY

As will be described in greater detail below, the instant disclosure generally relates to systems and methods for detecting cache-poisoning attacks in networks using SDPs. In one example, a computer-implemented method for detecting cache-poisoning attacks in networks using SDPs may include maintaining a cache of service information that identifies one or more services provided by one or more client devices connected to a network using an SDP. The method may also include detecting at least one cache-poisoning attack directed at the cache of service information by (1) receiving, from a client device connected to the network, at least one SDP message related to at least one service allegedly provided via the network, (2) identifying, within the SDP message, at least one attribute of the service allegedly provided via the network, and then (3) determining that the client device is attempting to corrupt the cache of service information by determining that the identified attribute of the service suggests that the service is illegitimate. Finally, the method may include performing at least one security action to mitigate the cache-poisoning attack in response to detecting the cache-poisoning attack.

As another example, a system for implementing the above-described method may include a maintenance module that maintains a cache of service information that identifies one or more services provided by one or more client devices connected to a network using an SDP. The system may also include a detection module that that detects at least one cache-poisoning attack directed at the cache of service information by (1) receiving, from a client device connected to the network, at least one SDP message related to at least one service allegedly provided via the network, (2) identifying, within the SDP message, at least one attribute of the service allegedly provided via the network, and then (3) determining that the client device is attempting to corrupt the cache of service information by determining that the identified attribute of the service suggests that the service is illegitimate. The system may additionally include a security module that performs at least one security action to mitigate the cache-poisoning attack in response to the detection of the cache-poisoning attack. Finally, the system may include at least one processor configured to execute the maintenance module, the detection module, and the security module.

In some examples, the above-described method may be encoded as computer-readable instructions on a non-transitory computer-readable medium. For example, a computer-readable medium may include one or more computer-executable instructions that, when executed by at least one processor of a computing device, cause the computing device to maintain a cache of service information that identifies one or more services provided by one or more client devices connected to a network using an SDP. The computer-executable instructions may also cause the computing device to detect at least one cache-poisoning attack directed at the cache of service information by (1) receiving, from a client device connected to the network, at least one SDP message related to at least one service allegedly provided via the network, (2) identifying, within the SDP message, at least one attribute of the service allegedly provided via the network, and then (3) determining that the client device is attempting to corrupt the cache of service information by determining that the identified attribute of the service suggests that the service is illegitimate. Finally, the computer-executable instructions may cause the computing device to perform at least one security action to mitigate the cache-poisoning attack in response to the detection of the cache-poisoning attack.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
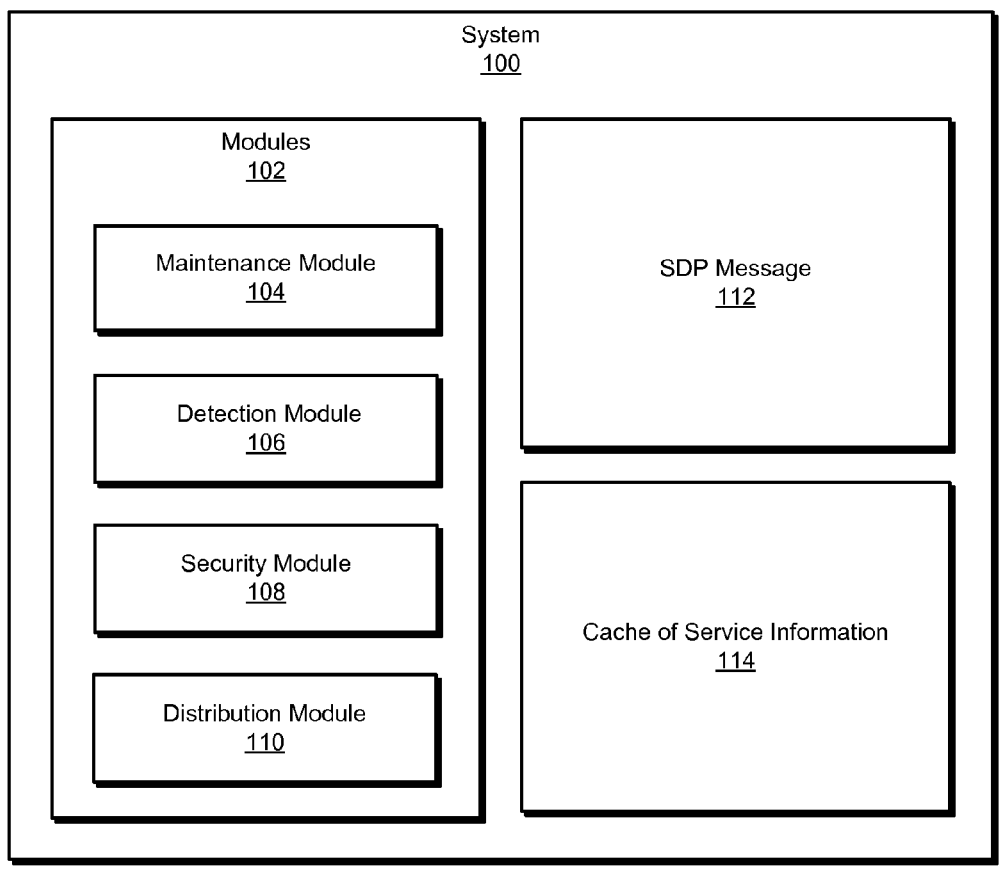
FIG. 1 is a block diagram of an exemplary system for detecting cache-poisoning attacks in networks using SDPs.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting cache-poisoning attacks in networks using SDPs. The phrase "cache-poisoning attack," as used herein, generally refers to any type or form of attempt to corrupt and/or contaminate a cache of service information with illegitimate data and/or information. Examples of such cache-poisoning attacks include, without limitation, attempts to add information about fake services to a cache of service information, attempts to add false information about legitimate services to a cache of service information, attempts to add false information about client devices providing legitimate services to a cache of service information, attempts to shut down legitimate services, combinations of one or more of the same, or any other type or form of attack that involves corrupting and/or contaminating a cache of service information.

The phrase "Service Discovery Protocol" and the abbreviation "SDP," as used herein, generally refer to any type or form of network protocol that facilitates automatic detection of devices and/or services offered by the devices connected to a network. Examples of such SDPs include, without limitation, APPLE'S BONJOUR, Universal Plug and Play (UPnP), SUN MICROSYSTEM'S JINI, Service Location Protocols (SLPs), Domain Name System (DNS) protocols, Multicast DNS (mDNS) protocols, combinations of one or more of the same, or any other suitable SDPs.

As will be explained in greater detail below, by identifying and/or analyzing one or more attributes of an alleged service within an SDP message received from a client device, the various systems and methods described herein may be able to determine that these attributes suggest that the alleged service is illegitimate. Moreover, by determining that the alleged service is illegitimate, the various systems and methods described herein may determine that the client device from which the SDP message originated is attempting to corrupt a cache of service information that identifies the services provided via a network. Upon determining that the client device is attempting to corrupt the cache of service information, the various systems and methods described herein may mitigate the client device's corruption attempt to ensure that the cache of service information identifies only legitimate services provided via the network.

Figure 2:
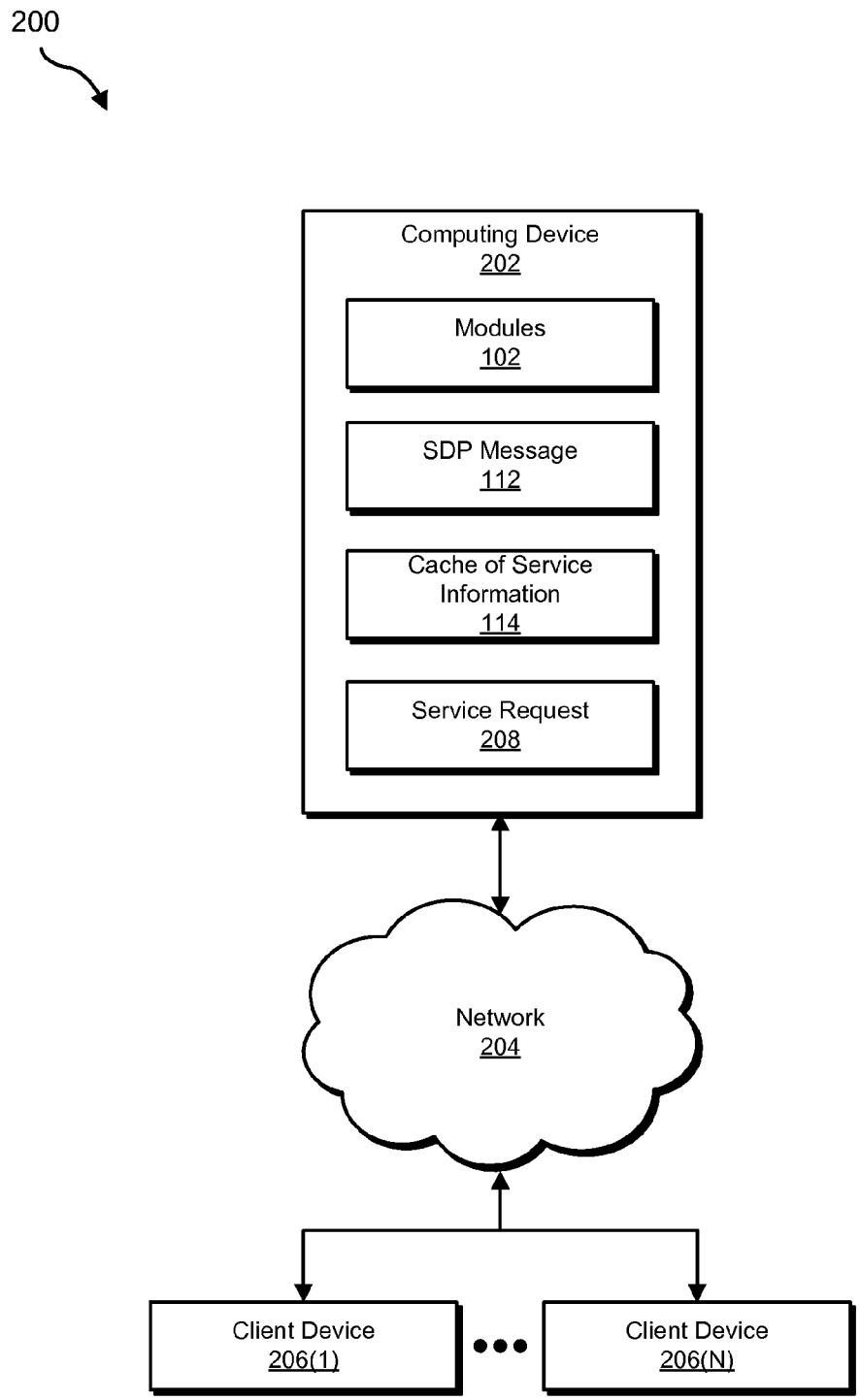
FIG. 2 is a block diagram of an additional exemplary system for detecting cache-poisoning attacks in networks using SDPs.

The following will provide, with reference to FIGS. 1-2, detailed descriptions of exemplary systems for detecting cache-poisoning attacks in networks using SDPs. Detailed descriptions of corresponding computer-implemented methods will be provided in connection with FIG. 3. Detailed descriptions of an exemplary cache of service information will be provided in connection with FIG. 4. Detailed descriptions of an exemplary SDP message will be provided in connection with FIG. 5. In addition, detailed descriptions of an exemplary computing system capable of implementing one or more of the embodiments described herein will be provided in connection with FIG. 6.

FIG. 1 is a block diagram of an exemplary system 100 for detecting cache-poisoning attacks in networks using SDPs. As illustrated in this figure, exemplary system 100 may include one or more modules 102 for performing one or more tasks. For example, and as will be explained in greater detail below, exemplary system 100 may include a maintenance module 104 that maintains a cache of service information that identifies one or more services provided by one or more client devices connected to a network using an SDP. Exemplary system 100 may also include a detection module 106 that detects at least one cache-poisoning attack directed at the cache of service information.

In addition, and as will be described in greater detail below, exemplary system 100 may include a security module 108 that performs at least one security action to mitigate the cache-poisoning attack in response to detecting the cache-poisoning attack. Exemplary system 100 may also include a distribution module 110 that distributes a fake service request to at least one client device connected to the network. Although illustrated as separate elements, one or more of modules 102 in FIG. 1 may represent portions of a single module or application (such as a security application installed on an access point or a controller within a network).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or client devices 206(1)-(N)) and/or computing system 610 in FIG. 6. One or more of modules 102 in FIG. 1 may also represent all or portions of one or more special-purpose computers configured to perform one or more tasks.

As illustrated in FIG. 1, exemplary system 100 may also include one or more SDP messages, such as SDP message 112. The phrase "SDP message," as used herein, generally refers to any type or form of message, communication, and/or information sent by a client device via an SDP. In some examples, SDP message 112 may include information that identifies a client device allegedly providing a service via a network. For example, SDP message 112 may include a MAC address of a client device allegedly providing a service via a network. Additionally or alternatively, SDP message 112 may include an IP address of the client device allegedly providing the service via the network.

In some examples, SDP message 112 may include information that describes the service allegedly provided by the client device. For example, SDP message 112 may describe a type of service allegedly provided by the client device. Additionally or alternatively, SDP message 112 may identify the number of services allegedly provided by the client device.

As illustrated in FIG. 1, exemplary system 100 may also include one or more caches, such as cache of service information 114. In one example, cache of service information 114 may be configured to store various data and/or information related to one or more services provided via a network. Examples of such data and/or information include, without limitation, an IP address of a client device allegedly providing a service via a network, a MAC address of a client device allegedly providing a service via a network, the device type of a client device allegedly providing a service via a network, the make and/or model of a client device allegedly providing a service via a network, a type of service allegedly provided by a client device via a network, combinations of one or more of the same, or any other data and/or information related to one or more services provided via a network.

Cache of service information 114 may represent portions of a single database or computing device or a plurality of databases or computing devices. For example, cache of service information 114 may represent a portion of computing device 202 in FIG. 2 and/or computing system 610 in FIG. 6. Alternatively, cache of service information 114 in FIG. 1 may represent one or more physically separate devices capable of being accessed by a computing device, such as client devices 206(1)-(N) in FIG. 2 and/or computing system 610 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with client devices 206(1)-(N) via a network 204. In one example, computing device 202 may be programmed with one or more of modules 102 and/or may store all or a portion of cache of service information 114.

Additionally or alternatively, computing device 202 may include SDP message 112 received from at least one of client devices 206(1)-(N) and/or a service request 208 received from at least one of client devices 206(1)-(N). The term "service request," as used herein, generally refers to any type or form of request for access to one or more services provided via a network and/or information related to the services provided via the network.

In one embodiment, one or more of modules 102 from FIG. 1 may, when executed by at least one processor of computing device 202 and/or client devices 206(1)-(N), enable computing device 202 and/or at least one of client devices 206(1)-(N) to detect cache-poisoning attacks in networks using SDPs. For example, and as will be described in greater detail below, maintenance module 104 may cause computing device 202 to maintain cache of service information 114. Detection module 106 may cause computing device 202 to detect at least one cache-poisoning attack directed at cache of service information 114 by (1) receiving SDP message 112 from one or more of client devices 206(1)-(N), (2) identifying at least one attribute of the service allegedly provided via network 204 within SDP message 112, and then (3) determining that one or more of client devices 206(1)-(N) is attempting to corrupt cache of service information 114 by determining that the identified attribute of the service suggests that the service is illegitimate. Security module 108 may then cause computing device 202 to perform at least one security action to mitigate the cache-poisoning attack in response to the detection of the cache-poisoning attack.

Computing device 202 generally represents any type or form of computing device capable of reading computer-executable instructions. Examples of computing device 202 include, without limitation, access points, controllers, network devices, client devices, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Client devices 206(1)-(N) generally represent any type or form of computing device capable of issuing SDP messages within a network. Examples of client devices 206(1)-(N) include, without limitation, laptops, tablets, desktops, servers, cellular phones, Personal Digital Assistants (PDAs), multimedia players, embedded systems, printers, televisions, DVD players, BLU-RAY players, combinations of one or more of the same, exemplary computing system 610 in FIG. 6, or any other suitable computing devices.

Network 204 generally represents any medium or architecture capable of facilitating communication or data transfer. Examples of network 204 include, without limitation, an intranet, a Wide Area Network (WAN), a Local Area Network (LAN), a WLAN, a Virtual LAN (VLAN), a Personal Area Network (PAN), the Internet, an SDP network, a Power Line Communications (PLC) network, a cellular network (e.g., a Global System for Mobile Communications (GSM) network), combinations of one or more of the same, or any other suitable network. Network 204 may facilitate communication or data transfer between computing device 202 and client devices 206(1)-(N) using wireless and/or wired connections. Additionally or alternatively, network 204 may support and/or use at least one SDP.

Figure 3:
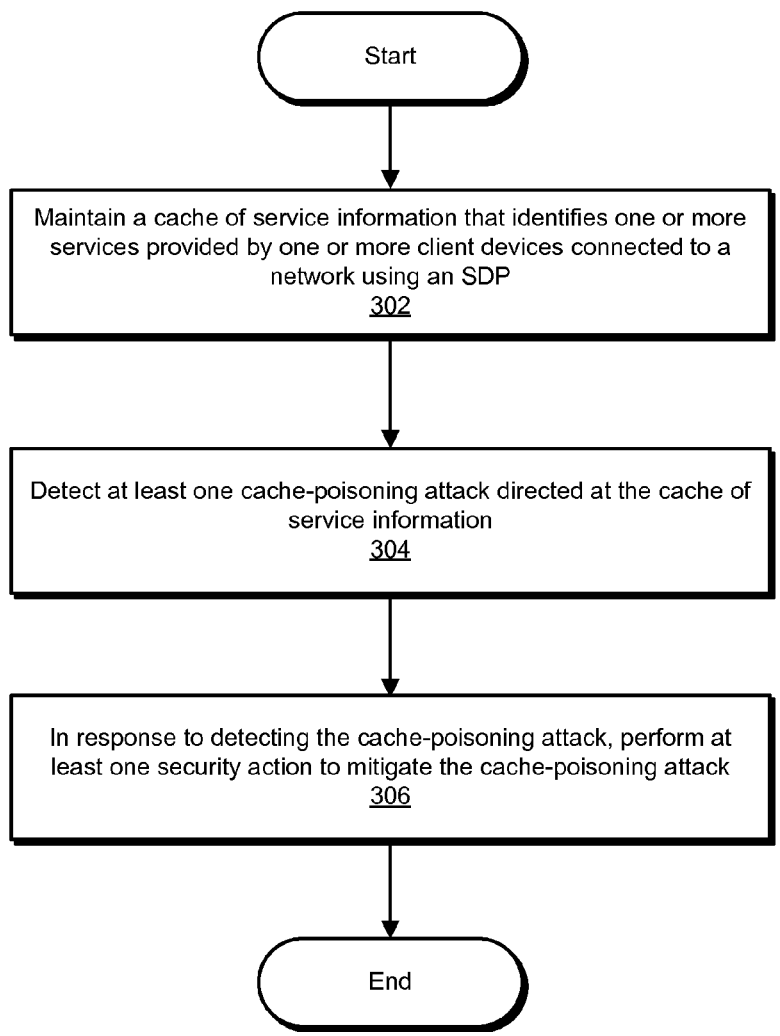
FIG. 3 is a flow diagram of an exemplary method for detecting cache-poisoning attacks in networks using SDPs.

FIG. 3 is a flow diagram of an exemplary computer-implemented method 300 for detecting cache-poisoning attacks in networks using SDPs. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 610 in FIG. 6.

As illustrated in FIG. 3, at step 302 one or more of the systems described herein may maintain a cache of service information that identifies one or more services provided by one or more client devices connected to a network using an SDP. For example, maintenance module 104 may, as part of computing device 202 in FIG. 2, maintain cache of service information 114 that identifies one or more services provided by one or more of client devices 206(1)-(N) connected to network 204. Examples of such services include, without limitation, printer services, media streaming services, electronic messaging services, application distribution services, combinations of one or more of the same, or any other suitable services.

The systems described herein may perform step 302 in a variety of ways. In some examples, maintenance module 104 may collect various information related to services provided by one or more of client devices 206(1)-(N) via network 204. In one example, maintenance module 104 may collect the information related to these services from SDP messages passing through network 204. For example, client devices 206(1)-(N) may distribute various SDP messages to one another via network 204. The SDP messages may include information that identifies the services provided by client devices 206(1)-(N) via network 204. Additionally or alternatively, the SDP messages may include information that identifies which of client devices 206(1)-(N) are allegedly providing the services via network 204.

During the distribution of these SDP messages via network 204, computing device 202 may intercept the SDP messages to gather information related to the services provided by client devices 206(1)-(N) via network 204. For example, computing device 202 may monitor network traffic passing through network 204. While monitoring this network traffic, computing device 202 may snoop the SDP messages being distributed to client devices 206(1)-(N) via network 204. The terms "snoop" and "snooping," as used herein, generally refer to any type or form of process in which a computing device listens for, identifies, and/or intercepts one or more SDP messages passing through a network.

As computing device 202 snoops the SDP messages being distributed via network 204, maintenance module 104 may extract portions of the information included in the SDP messages. Maintenance module 104 may then populate cache of service information 114 with the portions of information extracted from the SDP messages being distributed via network 204.

In one example, maintenance module 104 may update cache of service information 114 as SDP messages continue to pass through network 204. For example, client devices 206(1)-(N) may modify one or more features of the services that they provide to one another via network 204. Upon modifying these features of the services, client devices 206(1)-(N) may distribute updated SDP messages to one another via network 204. The updated SDP messages may include information that identifies the modified features of the services provided by client devices 206(1)-(N) via network 204.

During the distribution of these updated SDP messages via network 204, computing device 202 may intercept the updated SDP messages to gather information related to the services provided by client devices 206(1)-(N) via network 204. As computing device 202 intercepts the updated SDP messages, maintenance module 104 may extract portions of the information included in the updated SDP messages. Maintenance module 104 may then replace certain portions of information included in cache of service information 114 with the portions of information extracted from the updated SDP messages being distributed via network 204.

In one example, maintenance module 104 may collect the information related to the services provided by client devices 206(1)-(N) from SDP messages destined for computing device 202. For example, client devices 206(1)-(N) may send SDP messages to computing device 202 via network 204. As the SDP messages reach computing device 202 via network 204, maintenance module 104 may extract portions of the information included in the SDP messages. Maintenance module 104 may then populate cache of service information 114 with the portions of information extracted from the SDP messages destined for computing device 202.

Figure 4:
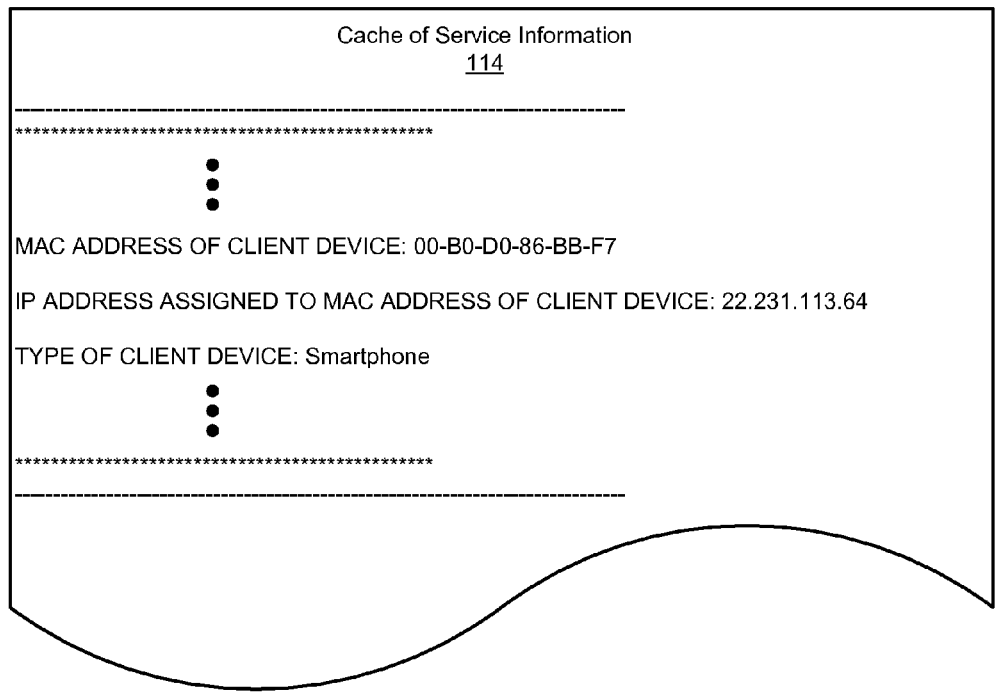
FIG. 4 is an illustration of an exemplary cache of service information.

As shown in FIG. 4, cache of service information 114 may include information that identifies a MAC address (in this example, "00-B0-D0-86-BB-F7") of a client device, an IP address (in this example, "22.231.113.64") assigned to the MAC address of the client device, and/or a device type (in this example, "smartphone") of the client device. Cache of service information 114 may also include various additional information related to client devices 206(1)-(N) and/or the services provided by client devices 206(1)-(N) via network 204.

Returning to FIG. 3, at step 304 one or more of the systems described herein may detect at least one cache-poisoning attack directed at the cache of service information. For example, detection module 106 may, as part of computing device 202 in FIG. 2, detect at least one cache-poisoning attack directed at cache of service information 114. In this example, the cache-poisoning attack may include an attempt to corrupt and/or contaminate cache of service information 114 with illegitimate data and/or information. Additionally or alternatively, the cache-poisoning attack may include an attempt to distribute at least one illegitimate SDP message to one or more of client devices 206(1)-(N) via network 204.

The systems described herein may perform step 304 in a variety of ways. In some examples, detection module 106 may detect the cache-poisoning attack based at least in part on at least one SDP message passing through network 204. In one example, computing device 202 may intercept SDP message 112 being distributed by client device 206(1) via network 204. For example, while monitoring the network traffic passing through network 204, computing device 202 may snoop SDP message 112 being distributed by client device 206(1) via network 204.

In some embodiments, SDP message 112 may include information related to at least one service allegedly provided via network 204. For example, SDP message 112 may include information that identifies at least one service allegedly provided by client device 206(1) via network 204. Additionally or alternatively, SDP message 112 may include information that identifies at least one service allegedly provided by client device 206(N) via network 204.

As computing device 202 snoops SDP message 112 being distributed by client device 206(1) via network 204, detection module 106 may receive SDP message 112. Detection module 106 may then identify at least one attribute of the service allegedly provided via network 204 within SDP message 112. Examples of such an attribute include, without limitation, an IP address of a client device allegedly providing a service via a network, at least one type of service allegedly provided by a client device via a network, a combination of services allegedly provided by a client device via a network, the number of services allegedly provided by a client device via a network, combinations of one or more of the same, or any other suitable attribute of a service allegedly provided by a client device via a network.

Upon identifying the attribute of the service within SDP message 112, detection module 106 may determine that client device 206(1) is attempting to corrupt cache of service information 114. For example, detection module 106 may perform at least one analysis, comparison, and/or verification attempt with the attribute of the service identified within SDP message 112. Detection module 106 may then determine that this attribute suggests that the service is illegitimate based at least in part on the analysis, comparison, and/or verification attempt.

Figure 5:
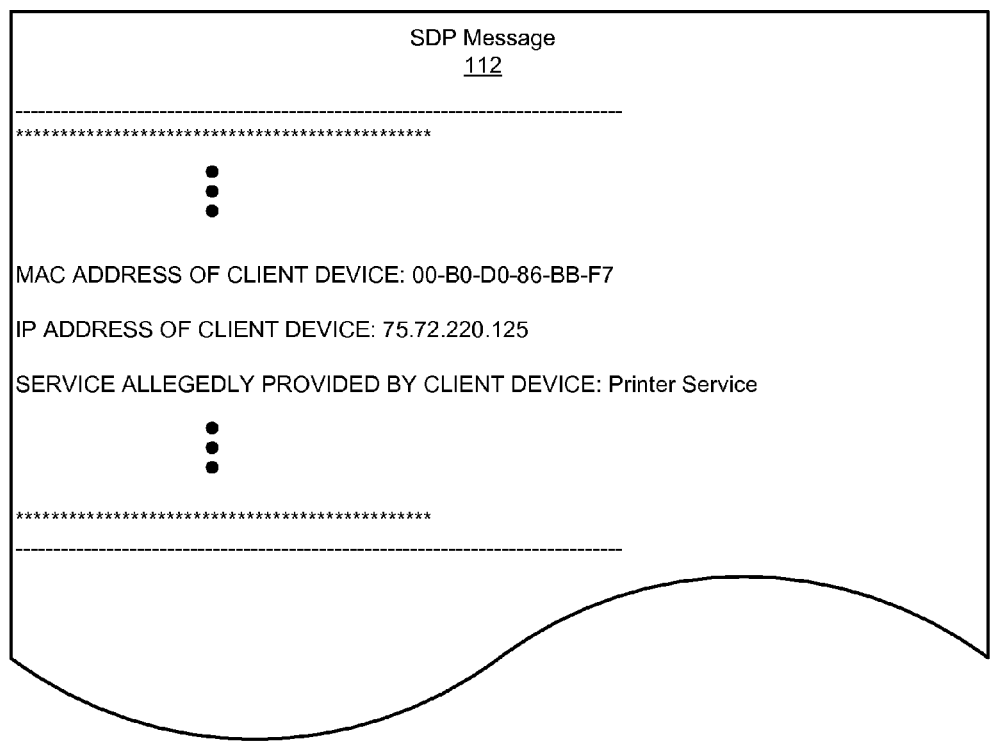
FIG. 5 is an illustration of an exemplary SDP message.

As illustrated in FIG. 5, SDP message 112 may include information that identifies a MAC address (in this example, "00-B0-D0-86-BB-F7") of a client device, an IP address (in this example, "75.72.220.125") of the client device, and/or a service (in this example, "printer service") allegedly provided by the client device. SDP message 112 may also include various additional information related to client device 206(1) and/or the services provided by client device 206(1) via network 204.

In one embodiment, the attribute of the service identified within SDP message 112 may include an IP address of the client device allegedly providing the service via network 204. In one example, detection module 106 may determine that the service is illegitimate due at least in part to the IP address of the client device not existing within cache of service information 114. For example, detection module 106 may identify IP address "75.72.220.125" within SDP message 112 in FIG. 5. In this example, the "75.72.220.125" IP address may represent the IP address of the client device allegedly providing the service via network 204.

Upon identifying the "75.72.220.125" IP address within SDP message 112, detection module 106 may compare the "75.72.220.125" IP address with cache of service information 114. For example, detection module 106 may search cache of service information 114 for the "75.72.220.125" IP address. During this search, detection module 106 may fail to find the "75.72.220.125" IP address within cache of service information 114. Detection module 106 may then determine that the "75.72.220.125" IP address does not exist within cache of service information 114 due at least in part to this failure to find the "75.72.220.125" IP address during the search. Finally, detection module 106 may determine that the printer service announced in SDP message 112 is illegitimate due at least in part to the "75.72.220.125" IP address not existing within cache of service information 114.

The phrase "illegitimate service," as used herein, generally refers to any type or form of service that is not actually provided by a client device. In one embodiment, a service may be illegitimate in the event that the client device cannot feasibly provide such a service. For example, a smartphone may claim to provide a printer service. However, this printer service may be illegitimate due at least in part to the smartphone's inability to feasibly provide such a printer service.

In another embodiment, a service may be illegitimate in the event that the client device is unable to provide the service at a particular point in time. For example, a smartphone may claim to provide a media streaming service. However, this media streaming service may be illegitimate due at least in part to the smartphone's failure to maintain a current subscription to an outside source that facilitates the media streaming service.

In a further embodiment, a service may be illegitimate in the event that the service corresponds to an unknown IP address and/or a closed port. Additionally or alternatively, the service may be illegitimate in the event that an SDP message advertising the service originates from an unknown client device.

In one example, detection module 106 may determine that the service is illegitimate due at least in part to the client device's failure to respond to one or more SDP messages. For example, detection module 106 may direct computing device 202 to distribute an SDP message to the "22.231.113.64" IP address stored in cache of service information 114 in FIG. 4. In the event that computing device 202 fails to receive an expected response to the SDP message distributed to the "22.231.113.64" IP address within a predetermined amount of time, detection module 106 may assume and/or infer that no client device has responded or will respond to the SDP message distributed to the "22.231.113.64" IP address. Detection module 106 may then determine that the service is illegitimate since no client device responded to the SDP message distributed to the "22.231.113.64" IP address.

Detection module 106 may also determine that no open communication port exists at the "22.231.113.64" IP address based at least in part on the failure to receive the expected response to the SDP message within the predetermined amount of time. Additionally or alternatively, detection module 106 may determine that no open communication port exists at the "22.231.113.64" IP address in response to an error message indicating that delivery of the SDP message was unsuccessful. Detection module 106 may then determine that the service is illegitimate due at least in part to no open communication port existing at the "22.231.113.64" IP address.

In one embodiment, the attribute of the service identified within SDP message 112 may include an IP address of the client device from which SDP message 112 originated. In one example, detection module 106 may determine that the service is illegitimate due at least in part to the IP address identified within SDP message 112 not matching the IP address assigned to the corresponding MAC address within cache of service information 114. For example, detection module 106 may identify IP address "75.72.220.125" within SDP message 112 in FIG. 5. In this example, the "75.72.220.125" IP address may represent the IP address assigned to the client device from which SDP message 112 originated.

Additionally or alternatively, detection module 106 may identify MAC address "00-B0-D0-86-BB-F7" within SDP message 112 in FIG. 5. In this example, the "00B0-D0-86-BB F7" MAC address may represent the MAC address of the client device from which SDP message 112 originated.

Upon identifying the "75.72.220.125" IP address and/or the "00B0-D0-86-BB F7" MAC address within SDP message 112, detection module 106 may identify an IP address assigned to the "00-B0-D0-86-BB-F7" MAC address within cache of service information 114. For example, detection module 106 may search cache of service information 114 in FIG. 4 for the "00-B0-D0-86-BB-F7" MAC address. During this search, detection module 106 may identify "22.231.113.64" as the IP address assigned to the "00-B0-D0-86-BB-F7" MAC address within cache of service information 114 in FIG. 4.

Upon identifying "22.231.113.64" as the IP address assigned to the "00-B0-D0-86-BB-F7" MAC address within cache of service information 114, detection module 106 may compare the "22.231.113.64" IP address with the "75.72.220.125" IP address identified within SDP message 112. Detection module 106 may then determine that the "22.231.113.64" IP address does not match the "75.72.220.125" IP address based at least in part on this comparison. As a result, detection module 106 may determine that the service is illegitimate due at least in part to the IP address identified within SDP message 112 not matching the IP address assigned to the corresponding MAC address identified within cache of service information 114.

In another embodiment, the attribute of the service identified within SDP message 112 may include one or more types of services allegedly provided by the client device via network 204. In one example, detection module 106 may determine that the service is illegitimate due at least in part to the client device being unable to provide the types of service identified within SDP message 112. For example, detection module 106 may search SDP message 112 in FIG. 5 for at least one type of service allegedly provided by the client device with the "00-B0-D0-86-BB-F7" MAC address via network 204. During this search, detection module 106 may determine that the client device with the "00-B0-D0-86-BB-F7" MAC address is allegedly providing a printer service via network 204.

Upon determining that the client device is allegedly providing the printer service, detection module 106 may compare the printer service with cache of service information 114. For example, detection module 106 may search cache of service information 114 in FIG. 4 for a device type of the client device with the "00-B0-D0-86-BB-F7" MAC address. During this search, detection module 106 may determine that the client device with the "00B0-D0-86-BB-F7" MAC address is a smartphone.

Upon determining that the client device is a smartphone, detection module 106 may determine whether a smartphone is able to provide the printer service announced in SDP message 112. For example, detection module 106 may retrieve a blacklist that identifies certain services that a smartphone is unable to feasibly provide via network 204. Detection module 106 may then search the blacklist for the printer service announced in SDP message 112. During this search, detection module 106 may identify the printer service in the blacklist.

Additionally or alternatively, detection module 106 may retrieve a whitelist that identifies certain services that a smartphone is able to feasibly provide via network 204. Upon retrieving this whitelist, detection module 106 may search the whitelist for the printer service announced in SDP message 112. During this search, detection module 106 may fail to find the printer service in the whitelist. As a result, detection module 106 may assume and/or infer that a smartphone is unable to feasibly provide the printer service via network 204. Detection module 106 may then determine that the printer service is illegitimate since a smartphone is unable to feasibly provide the printer service via network 204.

In one embodiment, the attribute of the service identified within SDP message 112 may include a combination of services allegedly provided by the client device via network 204. In one example, detection module 106 may determine that the services allegedly provided by the client device are illegitimate due at least in part to the client device being unable to provide the combination of services. For example, detection module 106 may search SDP message 112 in FIG. 5 for the combination of services allegedly provided by the client device with the "00-B0-D0-86-BB-F7" MAC address via network 204. During this search, detection module 106 may determine that the client device with the "00-B0-D0-86-BB-F7" MAC address is allegedly providing a printer service and at least one additional service (such as a media streaming service not listed in FIG. 5) via network 204.

Upon determining the combination of services allegedly provided by the client device with the "00-B0-D0-86-BB-F7" MAC address, detection module 106 may determine whether the client device is able to provide the combination of services announced in SDP message 112. For example, detection module 106 may retrieve a blacklist that identifies certain combinations of services that such a client device is unable to feasibly provide via network 204. Detection module 106 may then search the blacklist for the combination of services announced in SDP message 112. During this search, detection module 106 may identify the combination of services in the blacklist.

Additionally or alternatively, detection module 106 may retrieve a whitelist that identifies certain combinations of services that such a client device is able to feasibly provide via network 204. Upon retrieving this whitelist, detection module 106 may search the whitelist for the combination of services announced in SDP message 112. During this search, detection module 106 may fail to find the combination of services in the whitelist. As a result, detection module 106 may assume and/or infer that such a client device is unable to feasibly provide the combination of services via network 204. Detection module 106 may then determine that these services are illegitimate since such a client device is unable to feasibly provide the combination of services announced in SDP message 112 via network 204.

In another embodiment, the attribute of the service identified within SDP message 112 may include the number of services allegedly provided by the client device via network 204. In one example, detection module 106 may determine that the services allegedly provided by the client device are illegitimate due at least in part to the number of services. For example, detection module 106 may search SDP message 112 in FIG. 5 for the services allegedly provided by the client device with the "00-B0-D0-86-BB-F7" MAC address via network 204. During this search, detection module 106 may identify and/or count 4 services (not all of which are listed in FIG. 5) allegedly provided by the client device with the "00-B0-D0-86-BB-F7" MAC address.

Upon identifying and/or counting 4 services allegedly provided by the client device, detection module 106 may determine whether this number of services exceeds a predetermined threshold. For example, detection module 106 may determine that the client device with the "00-B0-D0-86-BB-F7" MAC address is unlikely to be able to provide more than 3 services via network 204. This number of services may represent a static threshold (such as a default threshold and/or a threshold set by an administrator). Additionally or alternatively, this number of services may represent a dynamic threshold that changes based at least in part on certain factors (such as the device type of the client device, the frequency with which the client device distributes SDP messages, and/or the types of services allegedly provided by the client device).

Upon determining that the client device is unlikely to be able to provide more than 3 services, detection module 106 may compare the 4 services allegedly provided by the client device with this 3-services threshold. Detection module 106 may determine that the 4 services exceeds the threshold of 3 services based at least in part on this comparison. Detection module 106 may then determine that the 4 services allegedly provided by the client device are likely illegitimate since the 4 services allegedly provided by the client device exceeds the 3-services threshold.

In some examples, detection module 106 may determine that the service allegedly provided by the client device is illegitimate due at least in part to the frequency with which the client device attempts to modify the attribute of the service. For example, after receiving SDP message 112, detection module 106 may receive an additional SDP message related to the service allegedly provided by the client device with the "00-B0-D0-86-BB-F7" MAC address. In this example, detection module 106 may identify a request within SDP message 112 to modify the attribute of the service. Examples of such a request may include, without limitation, requests to modify a device type of a client device, requests to modify the types of services allegedly provided by a client device, requests to modify the number of services allegedly provided by a client device, requests to modify an IP address of a client device, requests to modify the MAC address of a client device, combinations of one or more of the same, or any other suitable request.

Upon identifying the request to modify the attribute of the service, detection module 106 may determine whether the client device is attempting to modify the attribute of the service too frequently and/or within a predetermined amount of time. For example, detection module 106 may determine that computing device 202 received the additional SDP message within 30 seconds after receiving SDP message 112. In this example, detection module 106 may determine that the client device is unlikely to request a modification to the attribute of the service within 1 minute after distributing SDP message 112. This amount of time may represent a static threshold (such as a default threshold and/or a threshold set by an administrator). Additionally or alternatively, this amount of time may represent a dynamic threshold that changes based at least in part on certain factors (such as the device type of the client device, the frequency with which the client device has distributed SDP messages in the past, and/or the types of services allegedly provided by the client device).

Upon determining that the client device is unlikely to request a modification to the attribute of the service within 1 minute after distributing SDP message 112, detection module 106 may compare the 30-second interval between the SDP messages with this 1-minute threshold. Detection module 106 may determine that the 30-second interval does not satisfy the 1-minute threshold based at least in part on this comparison. Detection module 106 may then determine that the service allegedly provided by the client device is illegitimate since the 30-second interval does not satisfy the 1-minute threshold.

In some examples, detection module 106 may determine that the service allegedly provided by the client device is illegitimate due at least in part to one or more inconsistencies between the information identified in SDP message 112 and cache of service information 114. For example, detection module 106 may search SDP message 112 for the device type of the client device with the "00-B0-D0-86-BB-F7" MAC address. During this search, detection module 106 may determine that SDP message 112 indicates that the client device with the "00-B0-D0-86-BB-F7" MAC address is a printer (although not listed in FIG. 5).

Upon determining that SDP message 112 indicates that the client device with the "00-B0-D0-86-BB-F7" MAC address is a printer, detection module 106 may determine whether this device type coincides with cache of service information 114. For example, detection module 106 may search cache of service information 114 in FIG. 4 for the device type of the client device with the "00-B0-D0-86-BB-F7" MAC address. During this search, detection module 106 may determine that cache of service information 114 indicates that the client device with the "00-B0-D0-86-BB-F7" MAC address is a smartphone. Determination module 106 may then determine that the service allegedly provided by the client device is illegitimate since SDP message 112 indicates that the client device is a printer but cache of service information 114 indicates that the client device is a smartphone.

The systems described herein may also distribute fake service requests via the network to identify any client devices that respond to the fake service requests. For example, distribution module 110 may, as part of computing device 202 in FIG. 2, distribute a fake service request to one or more of client devices 206(1)-(N) via network 204. The phrase "fake service request," as used herein, generally refers to any type or form of request for a fake, made-up, and/or non-existent service. This fake service request may be configured to elicit a response only from the client device(s) attempting to corrupt and/or contaminate cache of service information 114 with illegitimate data and/or information.

In some examples, distribution module 110 may fabricate the fake service request based at least in part on random and/or illegitimate information and/or attributes. Distribution module 110 may then direct computing device 202 to distribute the fake service request to client devices 206(1)-(N) via network 204. In the event that client device 206(1) is attempting to corrupt and/or contaminate cache of service information 114, client device 206(1) may respond to the fake service request despite the random and/or illegitimate information and/or attributes included in the fake service request.

In one example, client device 206(1) may send an SDP message via network 204 in response to the fake service request. Computing device 202 may then snoop the SDP message sent by client device 206(1) in response to the fake service request. As computing device 202 snoops the SDP message, detection module 106 may receive the SDP message. Detection module 106 may then identify the IP address of client device 206(1) within the SDP message.

Continuing with this example, detection module 106 may determine that client device 206(1) responded to the fake service request based at least in part on the IP address of client device 206(1) identified within the SDP message. Detection module 106 may assume and/or infer that any service allegedly provided by a client device that responds to the fake service request is illegitimate. As a result, detection module 106 may determine that any service allegedly provided by client device 206(1) is illegitimate since client device 206(1) responded to the fake service request.

The systems described herein may also distribute multiple service requests via the network to identify any client devices that respond to each of the service requests. For example, distribution module 110 may, as part of computing device 202 in FIG. 2, distribute multiple service requests to one or more of client devices 206(1)-(N) via network 204. In the event that client device 206(1) is attempting to corrupt and/or contaminate cache of service information 114, client device 206(1) may respond to each of these service requests.

In one example, client device 206(1) may send multiple SDP messages via network 204 in response to these service requests. Computing device 202 may then snoop each of the SDP messages sent by client device 206(1) in response to these service requests. As computing device 202 snoops the SDP messages, detection module 106 may receive the SDP messages. Detection module 106 may then identify the IP address of client device 206(1) within each of the SDP messages.

Continuing with this example, detection module 106 may determine that client device 206(1) responded to each of the service requests based at least in part on the IP address of client device 206(1) identified within each of the SDP messages. Detection module 106 may assume and/or infer that any service allegedly provided by a client device that responds to each of the service requests is illegitimate. As a result, detection module 106 may determine that any service allegedly provided by client device 206(1) is illegitimate since client device 206(1) responded to each of the service requests.

Returning to FIG. 3, at step 306 one or more of the systems described herein may perform at least one security action to mitigate the cache-poisoning attack in response to detecting the cache-poisoning attack. For example, security module 108 may, as part of computing device 202 in FIG. 2, perform at least one security action to mitigate the cache-poisoning attack in response to the detection of the cache-poisoning attack. Examples of such a security action include, without limitation, de-authenticating a client device attempting to corrupt a cache of service information, routing network traffic originating from a client device attempting to corrupt a cache of service information to a VLAN, deleting an entry related to an illegitimate service from a cache of service information, dropping SDP messages received from a client device attempting to corrupt a cache of service information, combinations of one or more of the same, or any other suitable security action.

The systems described herein may perform step 306 in a variety of ways. In some examples, security module 108 may de-authenticate client device 206(1) since client device 206(1) is attempting to corrupt cache of service information 114. For example, security module 108 may prevent client device 206(1) from providing any services via network 204. In this example, security module 108 may delete each entry related to a service allegedly provided by client device 206(1) from cache of service information 114.

In some examples, security module 108 may drop any SDP messages originating from client device 206(1) since client device 206(1) is attempting to corrupt cache of service information 114. For example, computing device 202 may snoop one or more SDP messages originating from client device 206(1) via network 204. As computing device 202 snoops the SDP messages originating from client device 206(1), security module 108 may discard and/or reject these SDP messages to prevent at least one other client device (such as client device 206(N)) from receiving these SDP messages via network 204.

In some examples, security module 108 may distract and/or maintain interaction with client device 206(1) since client device 206(1) is attempting to corrupt cache of service information 114. For example, security module 108 may route network traffic originating from client device 206(1) to a VLAN. In this example, the VLAN may detect and/or capture the network traffic originating from client device 206(1). The VLAN may include a security server that records and/or analyzes the network traffic originating from client device 206(1). By recording and/or analyzing this network traffic, the security server may detect at least one threat and/or attack imposed by client device 206(1) and then mitigate the threat and/or attack.

Additionally or alternatively, the security server may respond to the network traffic originating from client device 206(1). For example, the security server may handle one or more requests issued by client device 206(1). By handling the requests issued by client device 206(1), the security server may keep client device 206(1) engaged and/or prevent client device 206(1) from launching an attack that disrupts and/or impairs computing device 202 and/or network 204.

As explained above in connection with exemplary method 300 in FIG. 3, an access point may detect cache-poisoning attacks in networks that support and/or use SDPs. For example, an access point may maintain a cache of service information that identifies services provided by client devices connected to a network using BONJOUR. The access point may implement a variety of different approaches to determine whether any of these client devices is attempting to perform a cache-poisoning attack directed at the cache of service information.

In an exemplary client-validation approach, the access point may monitor the network traffic passing through the network. While monitoring this network traffic, the access point may snoop BONJOUR messages sent by the client devices connected to the network. The access point may then compare these snooped BONJOUR messages with the cache of service information. In the event that certain information identified within a BONJOUR message does not match the corresponding information identified within the cache, the access point may determine that the BONJOUR message represents a cache-poisoning attack.

In an exemplary heuristics-based approach, the access point may monitor certain behaviors of the client devices offering services via the network. Examples of such behaviors include, without limitation, whether any client device changes service advertising messages too frequently, whether any client device is offering too many services, whether any client device responds to every service request distributed via a network, whether any client device offers varying combinations of services over a predetermined period of time, whether any client device issues a service advertising message that includes information that is inconsistent with a cache of service information, combinations of one or more of the same, or any other behaviors of a client device. While monitoring these behaviors of the client devices, the access point may identify at least one behavior indicating that a client device connected to the network is attempting to perform a cache-poisoning attack.

In an exemplary deception-based approach, the access point may distribute a fake service discovery request that includes illegitimate information and/or attributes via the network. This fake service discovery request may be configured to elicit a response only from client device(s) that are attempting to perform a cache-poisoning attack directed at the cache of service information. Upon receiving this fake service discovery request, a client device connected to the network may respond to the fake service discovery request. The access point may detect the client device's response to the fake service discovery request and then determine that the client device is attempting to perform a cache-poisoning attack based at least in part on the client device's response.

In an exemplary simulated-client approach, the access point may send a BONJOUR message to an IP address corresponding to a specific service identified within the cache of service information. By sending the BONJOUR message to the IP address, the access point may test whether an open communication port exists at the IP address. In the event that no open communication port exists at the IP address, the access point may determine that the information related to the specific service resulted from a cache-poisoning attack.

Figure 6:
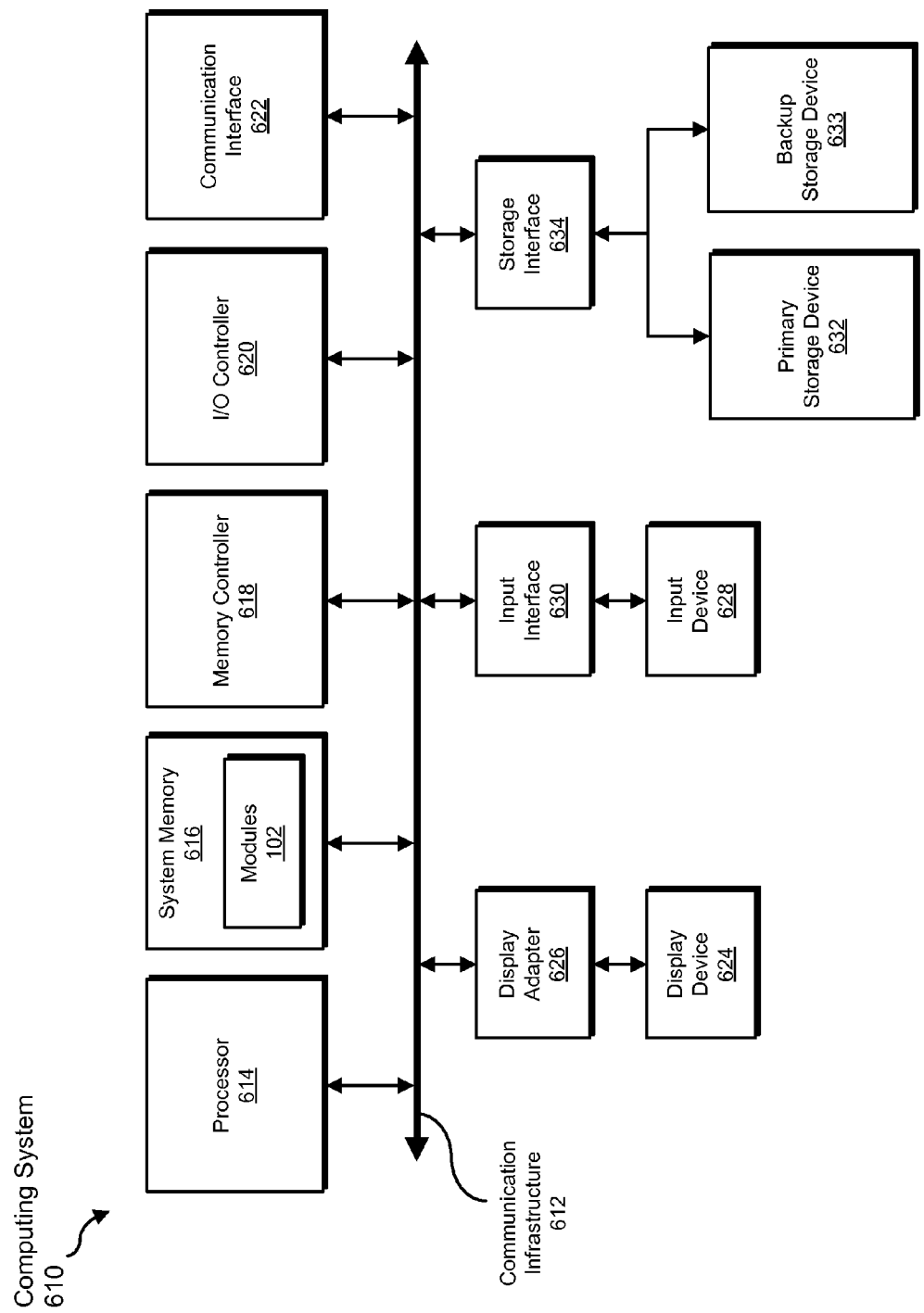
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any type or form of electrical load, including a single or multi-processor computing device or system capable of executing computer-readable instructions. Examples of computing system 610 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 610 may be programmed, configured, and/or otherwise designed to comply with one or more networking protocols. According to certain embodiments, computing system 610 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 610 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 610 may include various network and/or computing components. For example, computing system 610 may include at least one processor 614 and a system memory 616. Processor 614 generally represents any type or form of processing unit capable of processing data or interpreting and executing instructions. Processor 614 may represent an application-specific integrated circuit (ASIC), a system on a chip (e.g., a network processor), a hardware accelerator, a general purpose processor, and/or any other suitable processing element.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA) host adapters, Parallel ATA (PATA) host adapters, Serial ATA (SATA) host adapters, and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, cache of service information 114 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

As detailed above, computing system 610 may perform and/or be a means for performing, either alone or in combination with other elements, one or more steps of an exemplary method for detecting cache-poisoning attacks in networks using service discovery protocols (SDPs).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive SDP messages from a client device, transform information included within the SDP messages, use the result of the transformation to detect cache-poisoning attacks, and store the result of the transformation in a cache for future reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting cache-poisoning attacks in networks using service discovery protocols (SDPs), at least a portion of the method being performed by a computing device comprising at least one processor, the method comprising:
    maintaining a cache of service information that identifies one or more services provided by one or more client devices connected to a network using an SDP;
    detecting at least one cache-poisoning attack directed at the cache of service information by:
        receiving, from a client device connected to the network, at least one SDP message related to at least one service allegedly provided via the network;
        identifying, within the SDP message, at least one attribute of a type of the service allegedly provided via the network;
        determining that the client device is attempting to corrupt the cache of service information at least in part by:
            comparing the type of the service identified within the SDP message with the cache of service information;
            determining, based at least in part on the comparison, that a client device allegedly providing the service is unable to provide the type of service identified within the SDP message;
    in response to detecting the cache-poisoning attack, performing at least one security action to mitigate the cache-poisoning attack.

2. The method of claim 1, further comprising:
    identifying an Internet Protocol (IP) address of the client device allegedly providing the service via the network;
    determining that the IP address of the client device allegedly providing the service suggests that the service is illegitimate by:
        comparing the IP address of the client device allegedly providing the service with the cache of service information;
        determining, based at least in part on the comparison, that the IP address of the client device allegedly providing the service does not exist within the cache of service information;
        determining, due at least in part to the IP address of the client device not existing within the cache of service information, that the service is illegitimate.

3. The method of claim 1, further comprising:
    identifying an IP address of the client device from which the SDP message originated;
    determining that the IP address of the client device from which the SDP message originated suggests that the service is illegitimate by:
        identifying an IP address assigned to a Media Access Control (MAC) address of the client device within the cache of service information;
        determining that the IP address of the client device identified within the SDP message does not match the IP address assigned to the MAC address of the client device within the cache of service information;
        determining, due at least in part to the IP address identified within the SDP message not matching the IP address assigned to the MAC address of the client device within the cache of service information, that the service is illegitimate.

4. The method of claim 1, further comprising identifying an attribute of the client device allegedly providing the service;
    wherein determining that the client device allegedly providing the service is unable to provide the type of service identified within the SDP message is based at least in part on the attribute of the client device allegedly providing the service.

5. The method of claim 1, wherein:
    the attribute of the type of the service indicates a combination of services allegedly provided by the client device allegedly providing the service;
    determining that the client device allegedly providing the service is unable to provide the type of service identified within the SDP message comprises determining that the client device allegedly providing the service is unable to provide the combination of services.

6. The method of claim 1, wherein:
    the attribute of the type of the service indicates the number of services allegedly provided by the client device allegedly providing the service;
    determining that the client device allegedly providing the service is unable to provide the type of service identified within the SDP message comprises determining that the client device allegedly providing the service is unable to provide the number of services.

7. The method of claim 1, further comprising:
    distributing service requests to at least one client device connected to the network;
    receiving an SDP message in response to each service request distributed to the client device;
    identifying an IP address of the client device within each SDP message received in response to the service requests distributed to the client device;
    determining, based at least in part on the IP address of the client device identified within each SDP message, that the client device is responding to each service request distributed to the client device;

determining, due at least in part to the client device responding to each service request, that the service is illegitimate.

8. The method of claim 1, further comprising:
receiving at least one additional SDP message related to the service allegedly provided via the network;
identifying, within the additional SDP message, at least one request to modify an attribute of the service;
determining, based at least in part on the request identified within the additional SDP message, that the client device is attempting to modify the attribute of the service within a predetermined amount of time;
determining, due at least in part to the client device attempting to modify the attribute of the service within the predetermined amount of time, that the service is illegitimate.

9. The method of claim 1, further comprising:
distributing a fake service request to at least one client device connected to the network;
receiving the SDP message in response to the fake service request distributed to the client device;
identifying an IP address of the client device within the SDP message received in response to the fake service request;
determining, based at least in part on the IP address of the client device identified within the SDP message, that the client device responded to the fake service request;
determining, due at least in part to the client device having responded to the fake service request, that the service is illegitimate.

10. The method of claim 1, further comprising:
identifying an IP address of the client device allegedly providing the service via the network;
distributing an SDP message to the IP address of the client device allegedly providing the service via the network;
determining, based at least in part on a failure to receive a response to the SDP message within a predetermined amount of time, that the service is illegitimate.

11. The method of claim 10, wherein determining that the service is illegitimate comprises:
determining, based at least in part on the failure to receive a response to the SDP message within the predetermined amount of time, that no open communication port exists at the IP address;
determining, due at least in part to no open communication port existing at the IP address, that the service is illegitimate.

12. The method of claim 1, wherein receiving the SDP message related to the service allegedly provided via the network comprises:
identifying at least one SDP message originating from the client device;
intercepting the SDP message originating from the client device as the SDP message is distributed via the network.

13. The method of claim 1, wherein performing the security action to mitigate the cache-poisoning attack comprises de-authenticating the client device attempting to corrupt the cache of service information by preventing the client device from providing any services via the network.

14. The method of claim 1, wherein performing the security action to mitigate the cache-poisoning attack comprises:
maintaining interaction with the client device from which the SDP message originated by routing network traffic originating from the client device to a virtual local area network;
analyzing the network traffic originating from the client device at the virtual local area network;
detecting at least one threat imposed by the client device based at least in part on analyzing the network traffic of the client device;
in response to detecting the threat imposed by the client device, mitigating the threat.

15. The method of claim 1, wherein performing the security action to mitigate the cache-poisoning attack comprises deleting at least one entry related to the service allegedly provided by the client device from the cache of service information.

16. A system for detecting cache-poisoning attacks in networks using SDPs, the system comprising:
a maintenance module, stored in memory, that maintains a cache of service information that identifies one or more services provided by one or more client devices connected to a network using an SDP;
a detection module, stored in memory, that detects at least one cache-poisoning attack directed at the cache of service information by:
receiving, from a client device connected to the network, at least one SDP message related to at least one service allegedly provided via the network;
identifying, within the SDP message, at least one attribute of a type of the service allegedly provided via the network;
determining that the client device is attempting to corrupt the cache of service information by:
comparing the type of the service identified within the SDP message with the cache of service information;
determining, based at least in part on the comparison, that a client device allegedly providing the service is unable to provide the type of service identified within the SDP message;
a security module, stored in memory, that performs at least one security action to mitigate the cache-poisoning attack, in response to detecting the cache-poisoning attack;
at least one processor that executes the maintenance module, the detection module, and the security module.

17. The system of claim 16, wherein the detection module further:
identifies an IP address of the client device from which the SDP message originated;
identifies an IP address assigned to a MAC address of the client device within the cache of service information;
determines that the IP address of the client device identified within the SDP message does not match the IP address assigned to the MAC address of the client device within the cache of service information;
determines, due at least in part to the IP address identified within the SDP message not matching the IP address assigned to the MAC address of the client device within the cache of service information, that the service is illegitimate.

18. The system of claim 16, wherein the detection module further:
identifies an attribute of the client device allegedly providing the service;
determines that the client device allegedly providing the service is unable to provide the type of service identified within the SDP message based at least in part on the attribute of the client device allegedly providing the service.

19. The system of claim 16, further comprising a distribution module that distributes a fake service request to at least one client device connected to the network;
   wherein the detection module further:
      receives the SDP message in response to the fake service request distributed to the client device;
      identifies an IP address of the client device within the SDP message received in response to the fake service request;
      determines, based at least in part on the IP address of the client device identified within the SDP message, that the client device responded to the fake service request;
      determines, due at least in part to the client device having responded to the fake service request, that the service is illegitimate.

20. A non-transitory computer-readable medium comprising one or more computer-executable instructions that, when executed by at least one processor of a computing device, cause the computing device to:
   maintain a cache of service information that identifies one or more services provided by one or more client devices connected to a network using an SDP;
   detect at least one cache-poisoning attack directed at the cache of service information by:
      receiving, from a client device connected to the network, at least one SDP message related to at least one service allegedly provided via the network;
      identifying, within the SDP message, at least one attribute of a type of the service allegedly provided via the network;
      determining that the client device is attempting to corrupt the cache of service information by:
         comparing the type of the service identified within the SDP message with the cache of service information;
         determining, based at least in part on the comparison, that a client device allegedly providing the service is unable to provide the type of service identified within the SDP message;
   perform at least one security action to mitigate the cache-poisoning attack in response to detecting the cache-poisoning attack.

* * * * *